United States Patent [19]
Wu

[11] Patent Number: 6,084,641
[45] Date of Patent: Jul. 4, 2000

[54] FADE DETECTOR FOR DIGITAL VIDEO

[75] Inventor: Siu-Wai Wu, San Diego, Calif.

[73] Assignee: General Instrument Corporation, Horsham, Pa.

[21] Appl. No.: 08/906,809

[22] Filed: Aug. 6, 1997

[51] Int. Cl.$^7$ .................................................. H04N 5/262
[52] U.S. Cl. ...................... 348/722; 348/595; 348/699; 348/700; 348/701; 382/236; 358/182
[58] Field of Search ................................. 348/558, 595, 348/699, 700, 701, 722, 702, 416, 578, 415; 382/56, 54, 236, 239, 274, 232, 238; 358/182, 183, 185, 105; H04N 5/262

[56] References Cited

U.S. PATENT DOCUMENTS

| | | | |
|---|---|---|---|
| 5,245,436 | 9/1993 | Alattar | 358/182 |
| 5,500,689 | 3/1996 | Lam | 348/699 |
| 5,544,239 | 8/1996 | Golin | 348/699 |
| 5,734,419 | 3/1998 | Botsford, III et al. . | |
| 5,740,278 | 4/1998 | Berger | 348/415 |
| 5,771,316 | 6/1998 | Uz | 348/416 |

*Primary Examiner*—Mark R. Powell
*Assistant Examiner*—Wesner Sajous
*Attorney, Agent, or Firm*—Barry R. Lipsitz; Ralph F. Hoppin

[57] ABSTRACT

Static fade in a digital video image is detected. A difference in luminance intensity is determined for correspondingly positioned pixels in successive images. A variance in the difference is determined, and then normalized according to a mean squared value of the difference to provide a fade index $J_n$. The fade index is compared to a fade threshold, e.g., 0.9, to determine if a fade is indicated. Optionally, a check may be made to verify that a static fade is indicated by comparing the mean squared value of the difference to a motion threshold. The technique is suitable for both frame mode and field mode video sequences. When the digital images include field mode video, where each image has first and second fields, a fade index is determined separately for each field, and an overall fade index is obtained by averaging the fade indexes from each field. A scheme for detecting static fade on a macroblock by macroblock basis is also presented.

26 Claims, 5 Drawing Sheets

FADE DETECTOR FOR DIGITAL VIDEO

BACKGROUND OF THE INVENTION

The present invention relates to a method and apparatus for detecting static fade in a digital video image such as a video frame. A method and apparatus for detecting static fade for individual macroblocks in a video image is also presented. In particular, the invention is suitable for detecting temporal fluctuations of ambient light intensity in a source video image. With reliable detection of a fade, coding efficiency can be improved.

Recently, digital video transmission formats have become increasingly popular for providing television and other audio, video, and/or data services to consumers' homes. Such programming can be transmitted to a consumer's home via a direct broadcast satellite link, cable television network, telephone network, or other broadcast means. In addition to providing new and expanded program offerings, digital video can provide a higher image and audio quality than traditional analog television broadcasts.

In order to transmit digital video signals within available bandwidths, data compression is necessary. In particular, spatial compression techniques take advantage of correlations between neighboring pixels or blocks of pixels in a frame, while temporal techniques take advantage of correlations between pixels or blocks of pixels in successive video frames. Moreover, motion compensation techniques can provide even greater temporal compression.

However, to provide optimal compression of a sequence of video frames, it is desirable to have the capability to detect fade in or fade out in the image sequence. Fade in refers to a gradual increase in light intensity over two or more frames or other images, while fade out refers to a gradual decrease in light intensity. Fades may be used by cinematographers and other video editors to provide a dramatic effect or to emphasize changes in a story line, for example.

Current motion estimation hardware in digital video encoders such as those conforming to the MPEG-2 standard utilizes block matching algorithms with the objective of minimizing the sum of absolute error in the prediction. However, this approach fails to cope with temporal variation of light intensity such as fade in and fade out in the source video. Details of the Motion Picture Expert's Group (MPEG) standard can be found in document ISO/IEC JTC1/SC29/WG11N0702, entitled "Information Technology—Generic Coding of Moving Pictures and Associated Audio, Recommendation H.262," Mar. 25, 1994.

It is desirable to detect a static fade, that is, a fade in or fade out effect on a still scene or on a scene that contains a small amount of motion, so that the video can be more efficiently coded. In particular, when a static fade is detected, the motion vectors can be forced to be zero, so less data is encoded and transmitted.

Various methods have been used to detect fade. For example, the sum of luminance pixel values may be computed for each frame. A scene is then classified as a fade if frame-to-frame changes in the sum exceeds a preset threshold. In another approach, the sum of luminance pixel differences between a current frame and the previous frame is computed. A scene is then classified as a fade if this sum exceeds a preset threshold. These methods are mathematically equivalent, although the implementation is different, and generally require the same amount of hardware. However, these approaches are generally not reliable for complicated scenes that contain a large amount of motion.

In another approach, a histogram of the pixel differences between the current frame and the previous frame is calculated. Fade is then detected by inspecting the histogram. This approach is more reliable, but the hardware required to implement a histogram calculator is relatively complex and expensive.

Accordingly, it would be desirable to have a method and apparatus for detecting fade in a video image sequence that is relatively simple to implement with low cost hardware, and requires only minor modifications to existing telecine or television detection hardware. The scheme should avoid false fade indications by distinguishing non-fade scenes such as stills and pictures that contain slow moving objects.

The scheme should further be compatible with existing digital video communication systems, including MPEG-1, MPEG-2, MPEG-4, ISO/IEC H.261 (videoconferencing), and ISO/IEC H.263. Moreover, the system should also be compatible with various color television broadcast standards such as the National Television Standards Committee (NTSC) standard, used in North America, and the Phase Alternating Line (PAL) standard, used in Europe, and should further be compatible with both frame and field mode video.

It would further be desirable to have a scheme for detecting static fade on sub-regions of a video image, such as on a macroblock by macroblock basis in a video frame, and setting the corresponding motion vectors to zero.

The present invention provides a system having the above and other advantages.

SUMMARY OF THE INVENTION

In accordance with the present invention, a method and apparatus are presented for detecting static fade in a digital video image.

A method for detecting a fade in a sequence of digital video images includes the step of determining a difference $d_n$ in pixel luminance intensity between first and second images. The difference in luminance intensity is determined for pixels which are positioned in corresponding (x,y) locations in the first and second images. A variance $V_n$ in the difference is determined, and then normalized according to a mean squared value $E_n/N$ of the difference to provide a fade index $J_n$. The fade index is compared to a fade threshold to determine if a fade is indicated. For example, if $J_n<0.9$, a fade is indicated.

Optionally, a check may be made to verify that a static fade is indicated. This is accomplished by comparing the mean squared value of the difference to a motion threshold. For example, testing has shown that the motion threshold may be 256 times the number of pixels in a field or frame, assuming pixel values range from 0 to 255. If the mean squared value of the difference is below the motion threshold, a static fade is indicated. Thus, the final decision of whether a static fade is indicated may depend on both the fade threshold and the motion threshold.

The technique is suitable for both frame mode (e.g., non-interlaced, or "progressive") and field mode (interlaced) video sequences. When the digital images include field mode video, where each image has first and second fields, the difference in luminance intensity is determined separately for each field of the first and second images. For example, $d_{n1}$ may represent the first field differences, while $d_{n2}$ represents the second field differences.

The variance in the differences is also determined separately for each field, and the variances are normalized according to a mean squared value of the differences to provide a fade index for each field. For example, $J_{n1}$ may represent the first field fade index, while $J_{n2}$ represents the second field fade index. An overall averaged fade index is then determined for each of the images over the fields, e.g., $J_{ave}=(J_{n1}+J_{n2})/2$, and the averaged fade index is compared to the fade threshold to determine if a fade is indicated.

A corresponding apparatus is also presented.

A method is also presented for detecting fade for sub-regions such as macroblocks in a digital video image. An overall frame to frame residue is determined between a current frame macroblock and a correspondingly situated previous frame macroblock. This residue is used to determine an overall frame to frame variance $V_{ff}$ of the current macroblock. An overall motion compensation residue between the current macroblock and a best match macroblock in the previous frame is also determined, and used to provide an overall motion compensation variance $V_{mc}$ of the current macroblock. A static fade is indicated if $V_{mc}>V_{ff}$.

For field mode video, an intermediate frame to frame residue and intermediate frame to frame variance are determined separately for the top and bottom fields of the current macroblock using the corresponding fields of the correspondingly situated macroblock of the previous frame. An intermediate motion compensation residue and intermediate motion compensation variance are also determined separately for the top and bottom fields of the current macroblock using the corresponding fields of the best match macroblock of the previous frame. Finally, the intermediate frame to frame variance is averaged over the top and bottom fields to obtain the overall frame to frame variance, and the intermediate motion compensation variance is averaged over the top and bottom fields to obtain the overall motion compensation variance.

A corresponding apparatus is also presented.

DETAILED DESCRIPTION OF THE INVENTION

Figure 1:
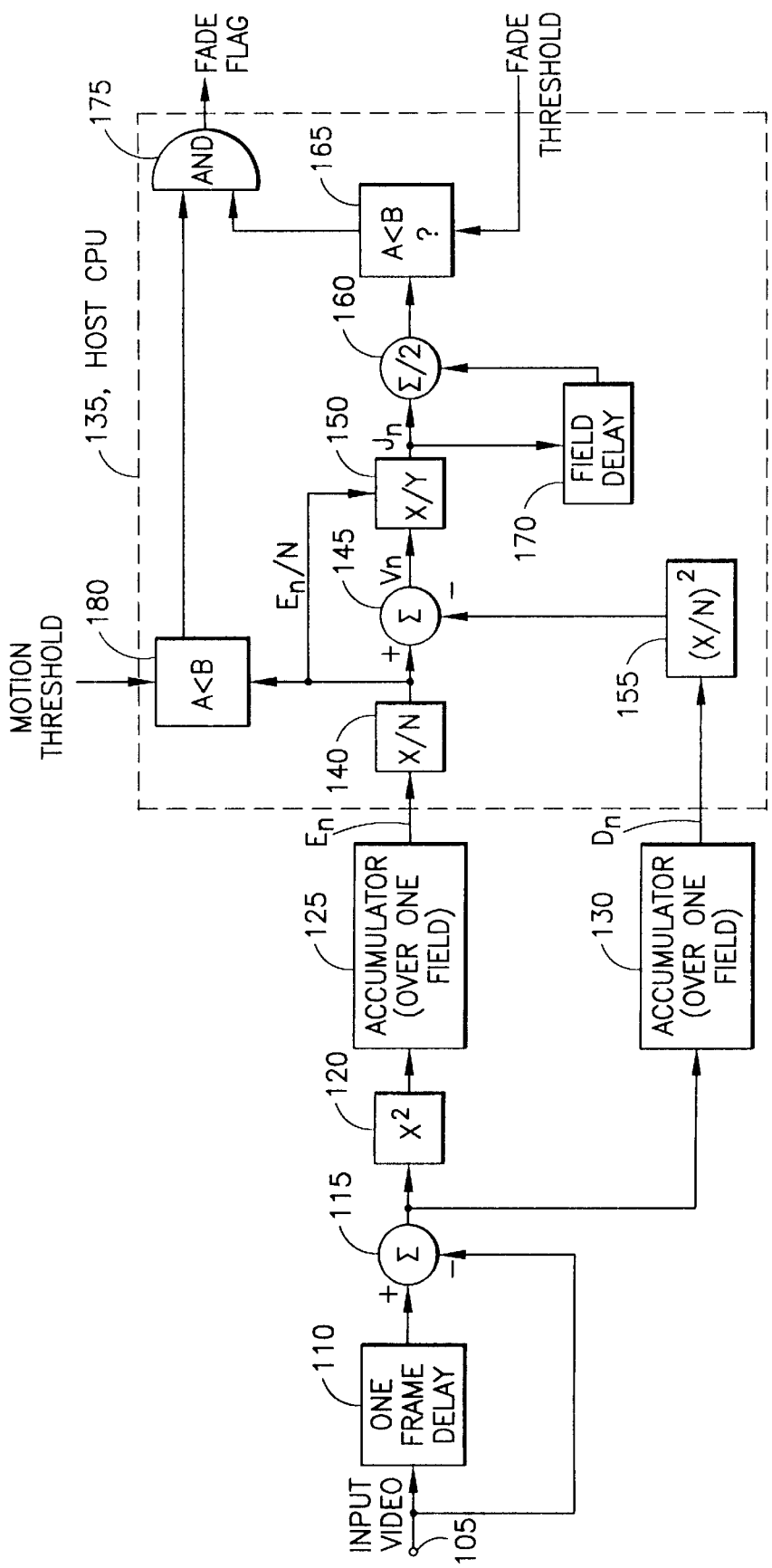
FIG. 1 is a block diagram of a fade detector for a video frame in accordance with the present invention.

A method and apparatus are presented for detecting static fade in a digital video image. A simple and low cost technique detects fade, or, in general, global changes in light intensity of source video.

Fade is detected by inspecting the degree of uniformity of the difference image between current and previous input frames. The degree of uniformity is measured by the variance, normalized by the mean squared value of the differences of the luminance pixel values over the picture. The fade detector shares the mean squared error calculator that is being used by many existing telecine detectors and scene change detectors. Therefore, the fade detector can be easily implemented with only one extra accumulator. Moreover, the effectiveness of the fade detection algorithm has been verified by simulations on a number of standard test sequences.

A video segment of static fade out can be modeled as a still image which is modulated by a sequence of gain factors $\{\alpha_1, \alpha_2, \alpha_3, \ldots\}$ such that, for field mode (e.g., interlaced) video, the luminance value at frame coordinate (x,y) of the nth input field is $$P_n(x,y)=\alpha_n P_{n-2}(x,y)$$

where $P_{n-2}(x,y)$ denotes the luminance values of the (n−2)th input field, and $0 \leq \alpha_n \leq 1$. For fade out, $\alpha$ decreases from one to zero with time or frame number. For fade in, $\alpha$ increases from zero to one with time or frame number. Similarly, for frame mode (e.g., progressive) video, the luminance value at frame coordinate (x,y) of the nth input frame is $$P_n(x,y)=\alpha_n P_{n-1}(x,y).$$

In the case of fade in, with field mode, $P_n(x,y)=(1/\alpha_{n+2})P_{n+2}(x,y)$. For example, assume $P_{20}(x,y)$ is the final steady image in a fade in. Then, an example prior pixel value is $P_{14}(x, y)=(1/\alpha_{16})(1/\alpha_{18})(1/\alpha_{20})P_{20}(x,y)$. With frame mode, $P_n(x,y)=(1/\alpha_{n+1})P_{n+1}(x,y)$.

Ideally, static fade can be detected by performing a statistical analysis of the ratio $r_n(x,y)=P_n(x,y)/P_{n-2}(x,y)$ for every input pixel. In particular, if the input video satisfies the fade model described above, the ratio $r_n(x,y)$ will be a constant which is equal to $\alpha_n$ for every pixel in the nth input field. For frame mode video, $r_n(x,y)$ will ideally be equal to $\alpha_{n-1}$. However, there are drawbacks to this approach. First, the computation of the ratio of the pixels in real time requires significant hardware complexity. Secondly, since a function of the form $1/x$ is sensitive to changes in x for small x, a statistical analysis of the ratio $r_n(x,y)$ is sensitive to source noise, truncation error, and deviations from the idealized static fade model.

A simpler and more robust scheme to detect static fade is therefore needed. A fade detection technique in accordance with the present invention detects fade by performing a statistical analysis of the change in luminance intensities with respect to the previous frame or field. For field mode video, the change in luminance intensity for pixels in the nth odd or even field is given by $$d_n(x,y)=P_n(x,y)-P_{n-2}(x,y).$$

For frame mode video, the change in luminance intensity for pixels in the nth frame is given by $$d_n(x,y)=P_n(x,y)-P_{n-1}(x,y).$$

It is assumed that, during a fade, the luminance differences $d_n(x,y)$ are approximately uniform over the field of input video so that a variance ($V_n$) of $d_n(x,y)$ over the field is small. Based on this assumption, static fade in the video could be detected by comparing the variance of the luminance differences with a preset threshold. However, it was found that the variance is also small in some non-fade scenes such as stills and pictures that contain slow moving objects.

Therefore, to avoid falsely classifying these scenes as fades, the variance of the luminance difference is normalized by the mean squared value of the luminance difference to generate a fade index $J_n$ for the field or frame of input video, namely $$J_n = \frac{V_n}{(E_n/N)} = \frac{(E_n/N) - (D_n/N)^2}{(E_n/N)}$$

where $$E_n = \sum_{(x,y) \in Field} d_n(x, y)^2,$$

$$D_n = \sum_{(x,y) \in Field} d_n(x, y),$$

and N is the number of pixels in the field or frame. For frame mode video, $(x,y) \in$ Frame for $E_n$ and $D_n$. Accordingly, if a field or frame has a low fade index value, it is very likely that the field or frame belongs to a fade. $E_n$ is the sum of the squared luminance differences, and $D_n$ is the sum of the luminance differences.

For a sequence that satisfies the above ideal static fade model, it can be easily shown that $$J_n = \frac{V_n}{\mu^2 + V_n}$$

where $\mu$ is the mean and $V_n$ is the variance of the image that generates the fade sequence (i.e., the image at the start of the fade sequence). For most fade images, the magnitude of $\mu^2$ is comparable to that of $V_n$, so $J_n$ is well below 1. On the other hand, for a typical motion video without fade, the luminance differences are equally likely to have positive and negative values, so $J_n$ is close to one. This is true since the magnitude of $(D_n/N)^2$ is small compared to $(E_n/N)$.

FIG. 1 is a block diagram of a fade detector for a video frame in accordance with the present invention. The fade detector may be used as part of a digital video encoder. Input video is provided to a terminal 105 and a one frame delay function 110. A difference between the delayed frame and the input video is taken at a subtractor 115 and provided to a square function 120. The square of the difference is provided to an accumulator 125 which accumulates the squared difference values over one field to provide $E_n$, the sum of squared differences.

The output of the subtractor 115 is also provided to an accumulator 130, which accumulates the difference values to provide $D_n$, the sum of pixel differences. For every input field, $E_n$ and $D_n$ are read by a host central processing unit (CPU) 135. The host CPU may be implemented in firmware using digital signal processing techniques. In particular, $E_n$ is divided by N, the number of pixels in the field, at a divisor function 140 to provide the mean square error, $E_n/N$ to a subtractor 145. Advantageously, hardware for calculating the mean square error is already used in many existing telecine detectors and scene change detectors, so the accumulator 130 may be the only extra hardware required. $E_n/N$ is also optionally provided to a motion detector (e.g., comparator) 180 for comparison with a motion threshold, as discussed below. A corresponding signal is then provided to an AND gate 175.

$D_n$ is divided by N, and the resulting value, $D_n/N$, is squared at a function 155. At the subtractor 145, the difference $E_n/N - (D_n/N)^2$ is taken to provide the variance $V_n$ to a divisor function 150. The divisor function 150 provides the fade index for the present field $J_n = V_n/(E_n/N)$ to a field delay function 170 and a summer and divisor function 160. The field delay function 170 is a temporary storage element such as a random access memory (RAM) which stores the first field fade index while a second field of the image is being processed. When the fade index for the second field has been output from the divisor function 150 and provided to the summer and divisor function 160, the summer and divisor function 160 takes the average of the fade indexes for the first and second fields. For example, let $J_{n1}$ and $J_{n2}$ be the first and second field fade indexes, respectively. Then an average or overall fade index is $J_{ave} = (J_{n1} + J_{n2})/2$.

After the fade index is averaged over both fields of the frame, it is compared to an empirical threshold at a detector (e.g., comparator) 165. A fade is indicated if the average is below the threshold. As discussed below and in connection with FIGS. 2–4, a threshold value of 0.9 can correctly identify most fade sequences.

When the motion detector 180 and AND gate 175 are provided in an optional embodiment, a signal is provided from the detector 165 to the AND gate 175, and a corresponding static fade flag is set. That is, if $J_n$ is below the fade threshold and $E_n/N$ is below the motion threshold, a fade is indicated. For example, the fade flag=1 when a fade is indicated. The fade flag is used to set the motion vectors to zero.

While the fade detector of FIG. 1 has been discussed in connection with a 2:1 interlaced video image, it will be understood that it may be adapted for other interlaced and pulldown video formats. Additionally, frame mode video may be processed as shown in FIG. 1, with the following changes. First, the accumulators 125 and 130 accumulate values over one frame instead of one field. Second, the delay 170 and average 160 blocks are not needed. Third, the value N in the divisor function 140 is taken over the entire frame instead of field.

Additionally, the scheme may be adapted for use with portions of a frame, such as a video object plane (VOP) as defined in the MPEG-4 standard.

Moreover, it will be appreciated that various other hardware and/or firmware implementations are possible. For example, a parallel processing configuration may be used to process the first and second fields of an interlaced video image at the same time.

The fade detection technique of the present invention has been tested on sequences with varying degrees of motion, and has been shown to correctly identify the fading scenes. However, forcing zero-motion should apply only to static fade, that is, fade on a picture sequence that contains an insignificant amount of motion. To avoid forcing motion vectors to zero for fading scenes with a large amount of motion, the fade detector of FIG. 1 optionally uses the motion detector 180 and AND gate 175. It can be assumed that there is an insignificant amount of motion when the mean squared value of the differences between successive frames or fields, $E_n/N$, is below a motion threshold. Note that the value $E_n/N$ is readily available in the fade detector for input to the comparator 180.

Table 1, below, shows the result of fade detection for test sequences in which the threshold on the fade index is 0.9, and the motion threshold for the average sum of squared difference $E_n/N$ is 256 times the number of pixels N in a frame (for frame mode video) or field (for field mode video), assuming the pixel values range from 0 to 255. This empirical value has been shown in experiments to be effective. The test sequences in Table 1 are described in Test Model Editing Committee, "Test Model 5", ISO/IEC JTC1/SC29/WG11 MPEG93/457, April 1993. The scheme was also shown to be effective with test sequences where realistic levels of noise were introduced.

TABLE 1

| Sequence | Fade Detected | Static Fade Detected | Comments |
| --- | --- | --- | --- |
| Starsailer-fade | frames 0–29 | frames 0–29 | |
| Flower-fade | frames 0–29 | frames 0–29 | |
| Confetti | frame 111–119 | frames 118–119 | The brightness of frames 118–119 is close to black. |
| Flower garden | none | none | |
| Bus | none | none | |
| Mobile-calendar | none | none | |
| Cheer-leader | none | none | |
| NHK-flower | none | none | |

The NHK-flower sequence contains slowly moving objects. For this sequence, both the variance and the mean squared values of the luminance differences are small. However, the fade indices are very close to one and the sequences are correctly classified.

A statistical analysis of the luminance pixel differences for a number of test sequences was performed. The values of the fade index $J_n$ for field mode video averaged over both fields for each input frame are plotted in FIGS. 2–4. As seen from the measured data, a threshold value of 0.9 can correctly classify most frames.

Figure 2:
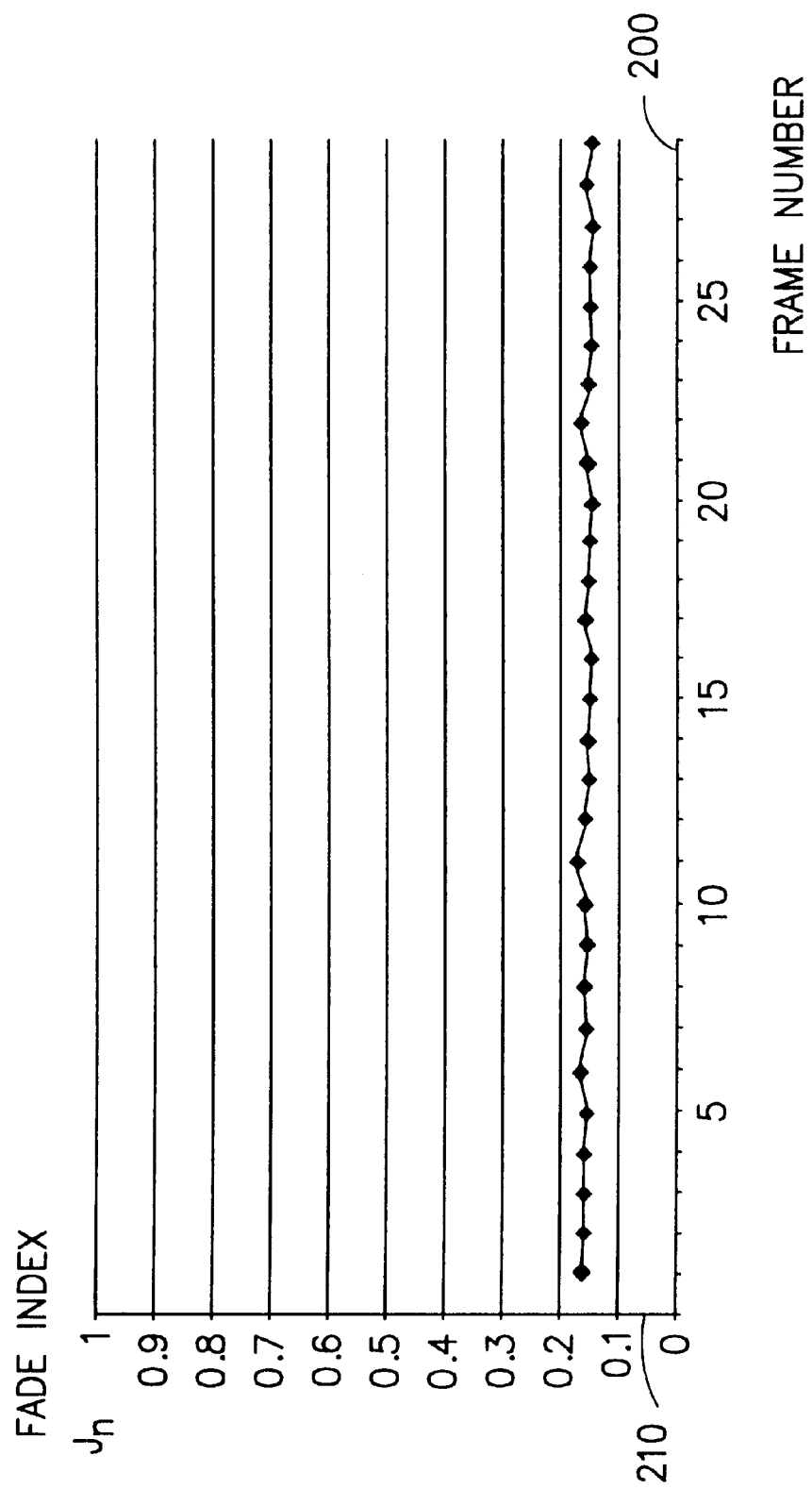
FIG. 2 is a graph showing the fade index for the "Flower-fade" video test sequence in accordance with the present invention.

FIG. 2 is a graph showing the fade index for the "Flower-fade" video test sequence in accordance with the present invention. Frame number is shown on an axis 200, while the value of the fade index is shown on an axis 210. The fade index $J_n$ is approximately 0.2, which is well below the threshold of 0.9. Accordingly, a fade is indicated for the frames shown.

Figure 3:
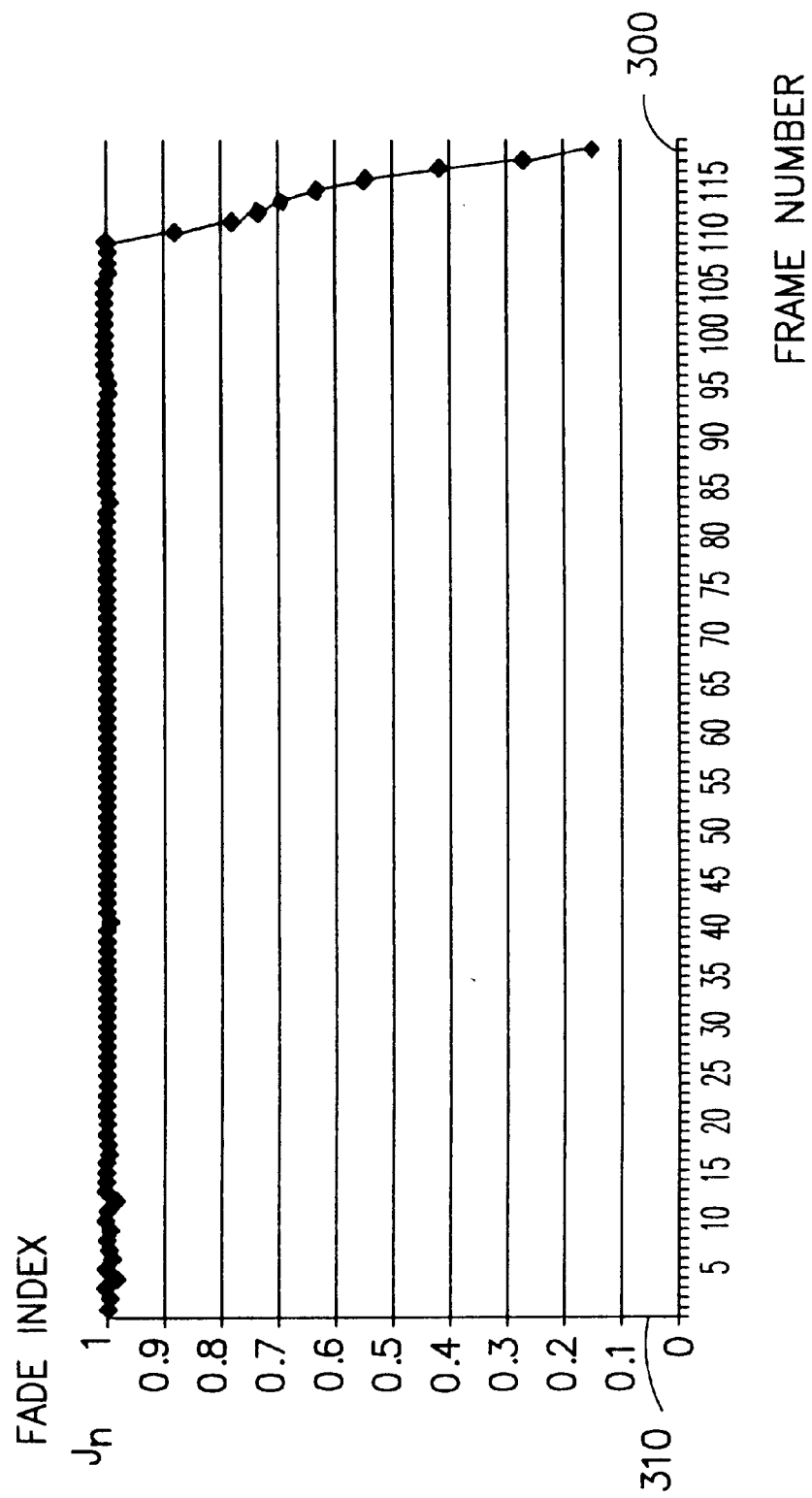
FIG. 3 is a graph showing the fade index for the "Confetti" video test sequence in accordance with the present invention.

FIG. 3 is a graph showing the fade index for the "Confetti" video test sequence in accordance with the present invention. Frame number is shown on an axis 300, while the value of the fade index is shown on an axis 310. The Confetti sequence has a number of randomly flying objects in a bright background. It fades into black in the last 10 frames, beginning at approximately frame 111. The fade out is clearly identified in the plot where $J_n$ falls below 0.9.

Figure 4:
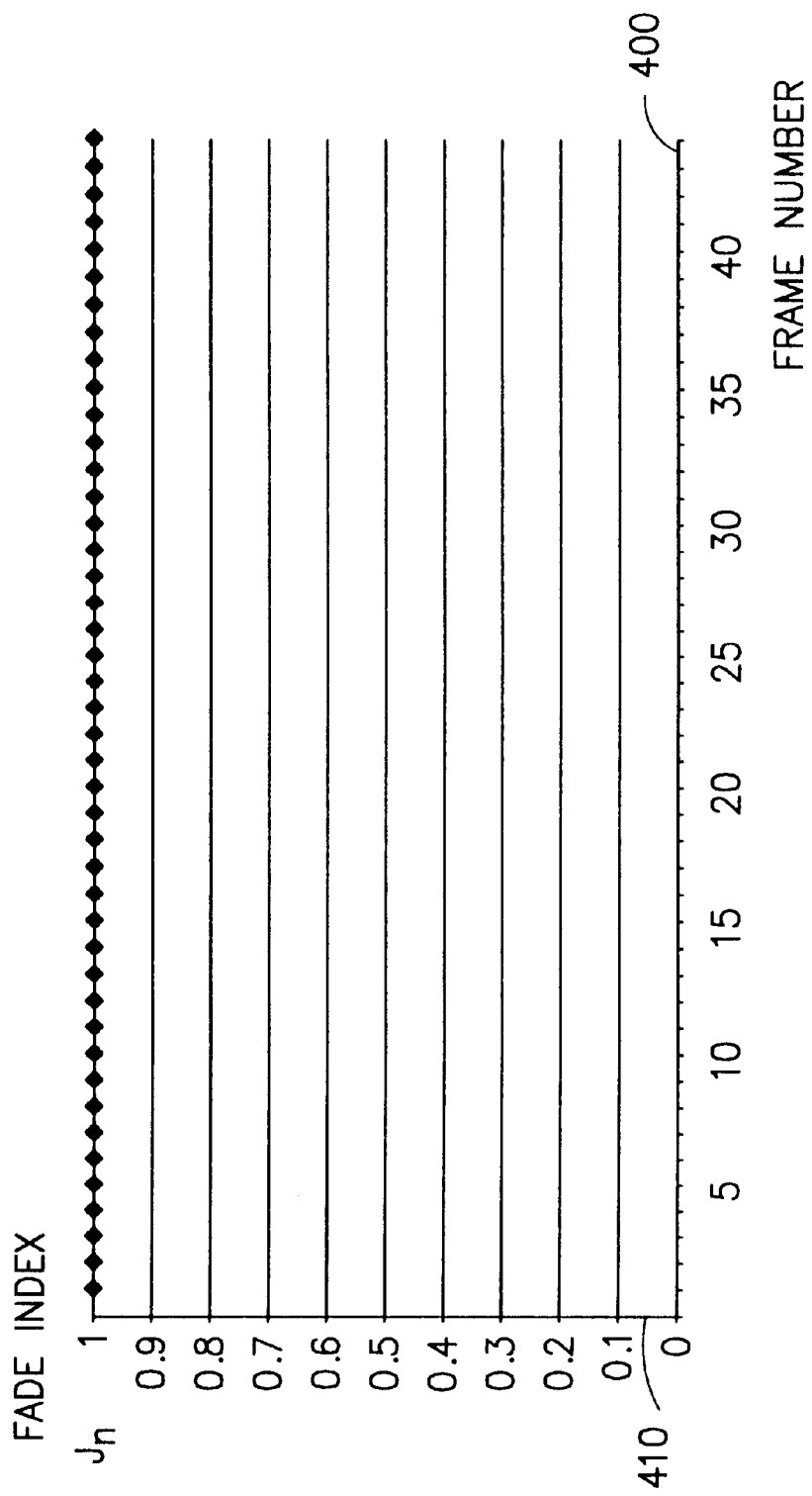
FIG. 4 is a graph showing the fade index for the "Flower garden" video test sequence in accordance with the present invention.

FIG. 4 is a graph showing the fade index for the "Flower garden" video test sequence in accordance with the present invention. Frame number is shown on an axis 400, while the value of the fade index is shown on an axis 410. The Flower-garden is a typical bright flowery video sequence with no fade indicated. Accordingly, note that the values of the fade index $J_n$ is close to one throughout the sequence, well above the fade threshold.

Figure 5:
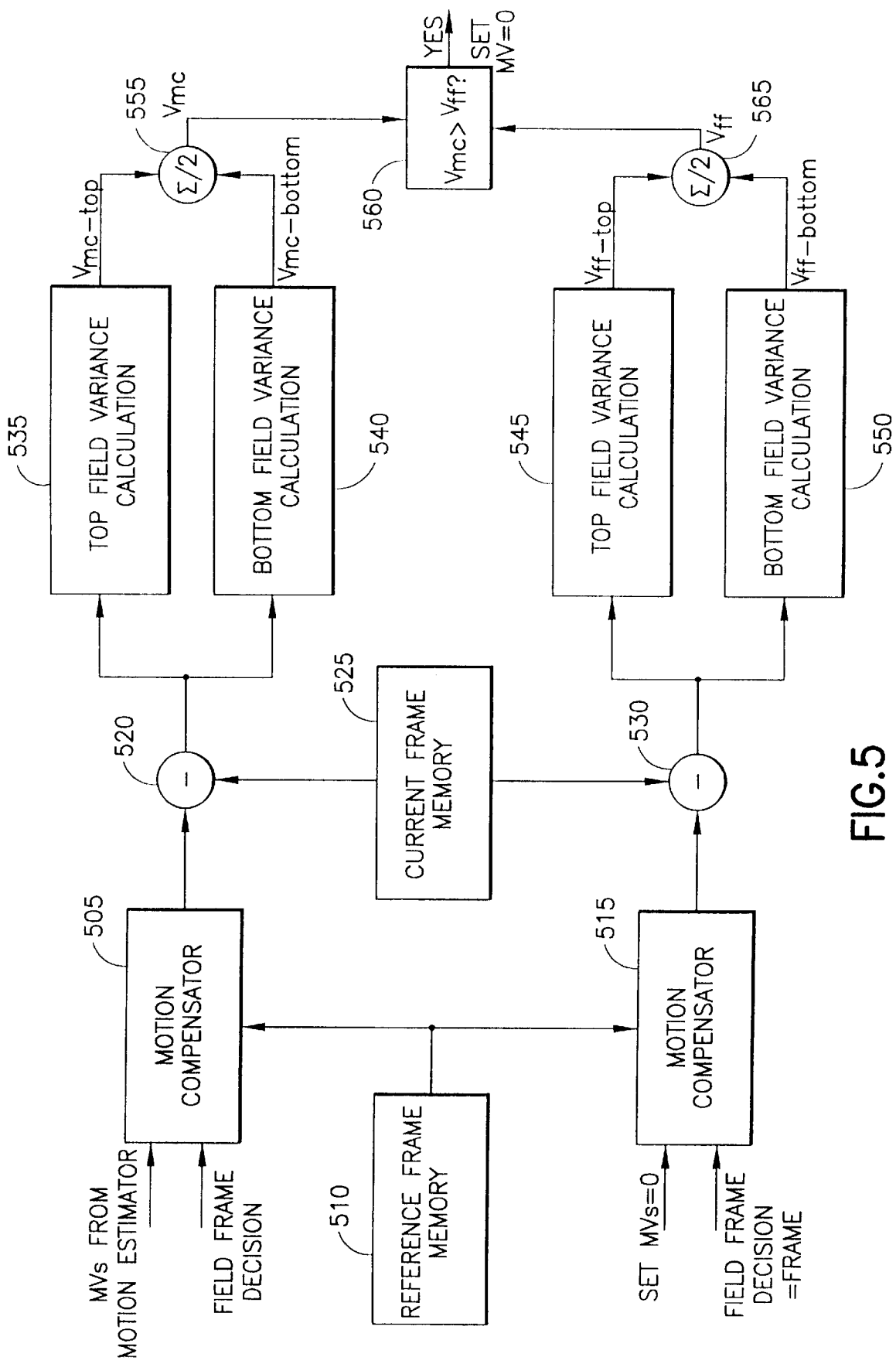
FIG. 5 is a block diagram of a fade detector for an individual macroblock of a video image in accordance with the present invention.

FIG. 5 is a block diagram of a fade detector for an individual macroblock of a video image in accordance with the present invention. In this alternative embodiment of the present invention, coding efficiency can be improved in fade scenes by selectively setting motion vectors to zero for different sub-regions of a video frame, such as on a macroblock by macroblock basis.

First, for each macroblock, calculate a variance $V_{mc}$ of the motion compensated residual with motion vectors generated by conventional motion estimation. This residual is the difference in pixel luminance values between a current frame macroblock and the best match macroblock in the previous frame. The best match macroblock is typically selected as the macroblock in a defined search error which results in the smallest error between the current macroblock and the previous frame macroblock, e.g., according to the sum of the absolute differences or other criteria used in known video coding standards.

Next, calculate the variance $V_{ff}$ of a frame to frame difference, that is, a motion compensated residual with the motion vector set to zero for frame motion. This residual is the difference in pixel luminance values between a current frame macroblock and the macroblock in the previous frame which is positioned in a corresponding location in the frame.

For field mode video, the variances of top and bottom fields are calculated separately and then averaged to generate the variance of the macroblock. For example, a variance $V_{mc\text{-}top}$ is determined for the residual between the top field of the current frame macroblock and the top field of the best match macroblock in the previous frame. Likewise, a variance $V_{mc\text{-}bottom}$ is determined for the residual between the bottom field of the current frame macroblock and the bottom field of the best match macroblock in the previous frame. Then, the variance of the macroblock $V_{mc}$ is equal to $(V_{mc\text{-}top}+V_{mc\text{-}bottom})/2$. $V_{mc\text{-}top}$ and $V_{mc\text{-}bottom}$ may be considered to be intermediate motion compensation variances, while $V_{mc}$ is an overall motion compensation variance. Similarly, the variance $V_{ff}$ for field mode video can be determined as $(V_{ff\text{-}top}+V_{ff\text{-}bottom})/2$, where $V_{ff\text{-}top}$ is the frame to frame variance for the top field and $V_{ff\text{-}bottom}$ is the frame to frame variance for the bottom field. $V_{ff\text{-}top}$ and $V_{ff\text{-}bottom}$ may be considered to be intermediate frame to frame variances, while $V_{ff}$ is an overall frame to frame variance.

In accordance with the present invention, a static fade is indicated for each macroblock in the current frame when $V_{ff}<V_{mc}$. The scheme has been shown to be effective with testing of various video sequences. Alternatively, a bias or offset may be introduced such that a static fade is indicate when $V_{ff}<V_{mc}+k_1$, or when $V_{ff}<k_1 \cdot V_{mc}+k_2$, or the like, where $k_1$ and $k_2$ are constants. When a static fade is indicated for a macroblock, the motion vector for the macroblock is set to zero. The scheme may be repeated for each macroblock in the video image of the current frame until each macroblock has been processed. For macroblocks where a static fade is not indicated, the non-zero motion vector will be transmitted. Coding efficiency is improved by setting the motion vector to zero for at least some of the macroblocks in a video frame.

While the above scheme has been discussed in terms of macroblocks such as 16×16 luminance macroblocks, it will be appreciated that the scheme may be adapted for use with other sized sub-regions of a video image.

The scheme shown in FIG. 5 is suitable for implementing the macroblock by macroblock processing scheme of the present invention. A motion compensator 505 receives motion vectors (MVs) from a motion estimator which indicate the best match macroblocks in a reference frame (e.g., the previous frame). A field/frame decision is provided to indicate whether the video is field or frame mode. The motion compensator 505 also receives a data signal comprising the reference frame pixel data, and provides a signal comprising the best match macroblock to a subtractor 520.

The subtractor 520 also receives a signal comprising the current macroblock data from a current frame memory 525 and calculates a corresponding residue separately for the top and bottom fields for field mode video. For frame mode video, only one residue is calculated by the subtractor 520. The top field residue is provided to a top field variance calculation function 535, which calculates the variance $V_{mc\text{-}top}=(E_n/N)-(D_n/N)^2$. Similarly, the bottom field residue is provided to a bottom field variance calculation function 540, which calculates the variance $V_{mc\text{-}bottom}=(E_n/N)-(D_n/N)^2$. An average of $V_{mc\text{-}top}$ and $V_{mc\text{-}bottom}$ (i.e., $V_{mc}$) is determined at an averaging function 555 and provided to a decision function (e.g., comparator) 560.

A motion compensator 515 is similar to the motion compensator 505 but uses a motion vector which is fixed to zero to provide a signal comprising a non-motion compensated macroblock from the reference frame to the subtractor 530. The subtractor 530 also receives a signal comprising pixel data from the current macroblock from the current frame memory 525, and outputs a residue which is indicative of the frame to frame difference between the current macroblock and the correspondingly positioned reference macroblock. The residue is calculated separately for the top and bottom fields for field mode video.

The top field frame to frame residue is then provided to a top field variance calculation function 545 which corresponds to the top field variance calculation function 535, and to a bottom field variance calculation function 550 which corresponds to the bottom field variance calculation function 540. The top field variance calculation function 545 calculates the variance $V_{ff\text{-}top}$, while the bottom field variance calculation function 550 calculates the variance $V_{ff\text{-}bottom}$. An average of $V_{ff\text{-}top}$ and $V_{ff\text{-}bottom}$ (i.e., $V_{ff}$) is determined at an averaging function 565 and provided to the decision function 560.

At the decision function 560, if $V_{mc}>V_{ff}$, a static fade is indicated for the current macroblock, and the motion vector for that macroblock may be set to zero. The decision function may implement a modified decision criteria which includes the bias terms discussed above.

Accordingly, it can be seen that the present invention provides a method and apparatus for detecting fade in a video sequence. A fade index $J_n$ is calculated and compared to a fade threshold, such as 0.9. A fade in or fade out is indicated if $J_n$ is below the threshold. Optionally, the mean square difference, $E_n/N$ is compared to a motion threshold to verify that there is little or no motion, so that a still or static fade is detected. The scheme can reliably detect fades while providing a low cost implementation which utilizes hardware already present in most telecine detectors or scene change detectors. Various test sequences demonstrated the effectiveness of the scheme.

In an alternative embodiment, a scheme for detecting static fade on a macroblock by macroblock basis is presented. A frame to frame variance $V_{ff}$ is compared to a motion compensated variance $V_{mc}$ for each macroblock to determine if a static fade is indicated.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for detecting a fade in a sequence of digital video images, comprising the steps of:
    determining differences in pixel luminance intensity between first and second ones of said images;
    determining a variance in said differences;
    normalizing said variance according to a mean squared value of said differences to provide a fade index; and
    comparing said fade index to a fade threshold, and comparing said mean squared value to a motion threshold, to determine if a static fade is indicated; wherein:
        said fade threshold is approximately 0.9; and the static fade is indicated if said fade index is below said fade threshold.

2. The method of claim 1, wherein said digital images comprise field mode video, each image including first and second fields, said method comprising the further steps of:
    determining differences in pixel luminance intensity separately for each field of said first and second images;
    determining a variance in said differences for each of said fields;
    normalizing said variances according to a mean squared value of said differences to provide a fade index for each of said fields;
    determining an averaged fade index for each of said images over said fields; and
    comparing said averaged fade index to a fade threshold to determine if a fade is indicated.

3. The method of claim 1, wherein:
    said differences in pixel luminance intensity are determined for pixels which are positioned in corresponding locations in said first and second images.

4. The method of claim 1, wherein:
    said motion threshold corresponds approximately to said magnitude of said range; and
    the static fade is indicated when said mean squared value is less than said motion threshold.

5. An apparatus for detecting a fade in a sequence of digital video images, comprising:
    means for determining differences in pixel luminance intensity between first and second ones of said images;
    means for determining a variance in said differences;
    means for normalizing said variance according to a mean squared value of said differences to provide a fade index; and
    means for comparing said fade index to a fade threshold, and for comparing said mean squared value to a motion threshold, to determine if a static fade is indicated; wherein:
        said fade threshold is approximately 0.9; and the static fade is indicated if said fade index is below said fade threshold.

6. The apparatus of claim 5, wherein said digital images comprise field mode video, each image including first and second fields, said apparatus further comprising:
    means for determining differences in pixel luminance intensity separately for each field of said first and second images;
    means for determining a variance in said differences for each of said fields;
    means for normalizing said variances according to a mean squared value of said differences to provide a fade index for each of said fields;
    means for determining an averaged fade index for each of said images over said fields; and
    means for comparing said averaged fade index to a fade threshold to determine if a fade is indicated.

7. The apparatus of claim 5, wherein:
    said differences in pixel luminance intensity are determined for pixels which are positioned in corresponding locations in said first and second images.

8. The apparatus of claim 5, wherein:
    said motion threshold corresponds approximately to said magnitude of said range; and
    the static fade is indicated when said mean squared value is less than said motion threshold.

9. A method for detecting a fade in a current sub-region of a current video image in a sequence of digital video images, comprising the steps of:

determining an overall frame to frame residue between said current sub-region and a correspondingly situated sub-region of a reference video image;

determining an overall frame to frame variance of said current sub-region according to said overall frame to frame residue;

determining an overall motion compensation residue between said current sub-region and a best match sub-region of said reference video image;

determining an overall motion compensation variance of said current sub-region according to said overall motion compensation residue; and determining if a static fade is indicated for said current sub-region according to relative magnitudes of said overall motion compensation variance and said overall frame to frame variance.

10. The method of claim 9, wherein said digital images comprise field mode video, each image including first and second fields, said method comprising the further steps of:

determining a frame to frame residue and intermediate frame to frame variance separately for each field of said current sub-region using the corresponding fields of said correspondingly situated sub-region;

determining an intermediate motion compensation residue and intermediate motion compensation variance separately for each field of said current sub-region using the corresponding fields of said best match sub-region;

averaging the intermediate frame to frame variance over each field of said current sub-region to obtain said overall frame to frame variance; and averaging the intermediate motion compensation variance over each field of said current sub-region to obtain said overall motion compensation variance.

11. The method of claim 9, wherein:

a static fade is indicated for said current sub-region when the magnitude of said overall motion compensation variance is greater than the magnitude of said overall frame to frame variance.

12. The method of claim 9, wherein:

a static fade is indicated for said current sub-region when the magnitude of said overall motion compensation variance is greater than the magnitude of said overall frame to frame variance with a bias.

13. The method of claim 9, wherein:

said current sub-region comprises a macroblock.

14. An apparatus for detecting a fade in a sub-region of a current video image in a sequence of digital video images, comprising:

means for determining an overall frame to frame residue between said current sub-region and a correspondingly situated sub-region of a reference video image;

means for determining an overall frame to frame variance of said current sub-region according to said overall frame to frame residue;

means for determining an overall motion compensation residue between said current sub-region and a best match sub-region of said reference video image;

means for determining an overall motion compensation variance of said current sub-region according to said overall motion compensation residue; and means for determining if a static fade is indicated for said current sub-region according to relative magnitudes of said overall motion compensation variance and said overall frame to frame variance.

15. The apparatus of claim 14, wherein said digital images comprise field mode video, each image including first and second fields, further comprising:

means for determining a frame to frame residue and intermediate frame to frame variance separately for each field of said current sub-region using the corresponding fields of said correspondingly situated sub-region;

means for determining an intermediate motion compensation residue and intermediate motion compensation variance separately for each field of said current sub-region using the corresponding fields of said best match sub-region;

means for averaging the intermediate frame to frame variance over each field of said current sub-region to obtain said overall frame to frame variance; and means for averaging the intermediate motion compensation variance over each field of said current sub-region to obtain said overall motion compensation variance.

16. The apparatus of claim 14, wherein:

a static fade is indicated for said current sub-region when the magnitude of said overall motion compensation variance is greater than the magnitude of said overall frame to frame variance.

17. The apparatus of claim 14, wherein:

a static fade is indicated for said current sub-region when the magnitude of said overall motion compensation variance is greater than the magnitude of said overall frame to frame variance with a bias.

18. The apparatus of claim 14, wherein:

said current sub-region comprises a macroblock.

19. A method for detecting a fade in a sequence of digital video images, including first and second images, each image including first and second fields, comprising the steps of:

determining first differences in pixel luminance intensity for the first fields of said first and second images;

determining second differences in pixel luminance intensity for the second fields of said first and second images;

determining a first variance in said first differences, and a second variance in said second differences;

normalizing said first variance according to a mean squared value of said first differences to provide a fade index for said first fields;

normalizing said second variance according to a mean squared value of said second differences to provide a fade index for said second fields; and comparing an average of the fade indexes to a fade threshold, and comparing an average of the mean squared values to a motion threshold, to determine if a static fade is indicated.

20. An apparatus for detecting a fade in a sequence of digital video images, including first and second images, each image including first and second fields, comprising:

means for determining first differences in pixel luminance intensity for the first fields of said first and second images;

means for determining second differences in pixel luminance intensity for the second fields of said first and second images;

means for determining a first variance in said first differences, and a second variance in said second differences;

means for normalizing said first variance according to a mean squared value of said first differences to provide a fade index for said first fields;

means for normalizing said second variance according to a mean squared value of said second differences to provide a fade index for said second fields; and means for comparing an average of the fade indexes to a fade threshold, and comparing an average of the mean squared values to a motion threshold, to determine if a static fade is indicated.

21. A method for detecting a fade in a current sub-region of a current video image in a sequence of digital video images, each image including first and second fields, comprising the steps of:

(a) determining a frame-to-frame residue between the first fields of the current sub-region and a correspondingly situated sub-region of a reference video image;

(b) determining a frame-to-frame residue between the second fields of the current sub-region and the correspondingly situated sub-region;

(c) determining a frame-to-frame variance of the first field of the current sub-region according to the associated frame-to-frame residue;

(d) determining a frame-to-frame variance of the second field of the current sub-region according to the associated frame-to-frame residue;

(e) averaging the frame-to-frame variances to obtain an averaged frame-to-frame variance;

(f) determining a motion compensation residue between the first fields of the current sub-region and a best match sub-region of the reference video image;

(g) determining a motion compensation variance of the first field of the current sub-region according to the associated motion compensation residue;

(h) determining a motion compensation residue between the second fields of the current sub-region and the best match sub-region;

(i) determining a motion compensation variance of the second field of the current sub-region according to the associated motion compensation residue;

(j) averaging said motion compensation variances to obtain an averaged motion compensation variance; and (k) determining if a static fade is indicated for said current sub-region according to relative magnitudes of said averaged motion compensation variance and said averaged frame-to-frame variance.

22. An apparatus for detecting a fade in a current sub-region of a current video image in a sequence of digital video images, each image including first and second fields, comprising:

(a) means for determining a frame-to-frame residue between the first fields of the current sub-region and a correspondingly situated sub-region of a reference video image;

(b) means for determining a frame-to-frame residue between the second fields of the current sub-region and the correspondingly situated sub-region;

(c) means for determining a frame-to-frame variance of the first field of the current sub-region according to the associated frame-to-frame residue;

(d) means for determining a frame-to-frame variance of the second field of the current sub-region according to the associated frame-to-frame residue;

(e) means for averaging the frame-to-frame variances to obtain an averaged frame-to-frame variance;

(f) means for determining a motion compensation residue between the first fields of the current sub-region and a best match sub-region of the reference video image;

(g) means for determining a motion compensation variance of the first field of the current sub-region according to the associated motion compensation residue;

(h) means for determining a motion compensation residue between the second fields of the current sub-region and the best match sub-region;

(i) means for determining a motion compensation variance of the second field of the current sub-region according to the associated motion compensation residue;

(j) means for averaging said motion compensation variances to obtain an averaged motion compensation variance; and (k) means for determining if a static fade is indicated for said current sub-region according to relative magnitudes of said averaged motion compensation variance and said averaged frame-to-frame variance.

23. The method of claim 1, wherein:

said motion threshold is determined according to a magnitude of a range of said pixel luminance intensity.

24. The apparatus of claim 5, wherein:

said motion threshold is determined according to a magnitude of a range of said pixel luminance intensity.

25. The method of claim 19, wherein:

said motion threshold is determined according to a magnitude of a range of the pixel luminance intensity of the first and second fields.

26. The apparatus of claim 20, wherein:

said motion threshold is determined according to a magnitude of a range of the pixel luminance intensity of the first and second fields.

* * * * *